United States Patent [19]
Davis

[11] Patent Number: 5,472,311
[45] Date of Patent: Dec. 5, 1995

[54] WIND TURBINE APPARATUS

[76] Inventor: E. Frank Davis, 1610 SE. 86th Ave., Portland, Oreg. 97216

[21] Appl. No.: 324,364

[22] Filed: Oct. 14, 1994

Related U.S. Application Data

[63] Continuation of Ser. No. 123,167, Sep. 20, 1993, abandoned.

[51] Int. Cl.[6] .................................................. F03B 15/06
[52] U.S. Cl. ............................................. 415/4.1; 415/2.1
[58] Field of Search .............................. 415/2.1, 4.1, 4.3, 415/4.5, 908

[56] References Cited

U.S. PATENT DOCUMENTS

| | | | |
|---|---|---|---|
| 1,300,499 | 4/1919 | Slagel | 415/2.1 |
| 1,783,669 | 12/1930 | Oliver | 415/4.5 |
| 3,988,072 | 10/1976 | Sellman | 415/4.1 |
| 4,191,505 | 3/1980 | Kaufman | 415/2.1 |
| 4,418,287 | 11/1983 | Syverson | 290/44 |
| 4,449,887 | 5/1984 | Mundhenke | 415/4.1 |
| 4,508,972 | 4/1985 | Willmouth | 290/55 |
| 5,009,569 | 4/1991 | Hector et al. | 415/4.1 |
| 5,062,765 | 11/1991 | McConachy | 415/4.5 |
| 5,348,443 | 9/1994 | Roberts | 415/4.1 |
| 5,350,273 | 9/1994 | Hector, Sr. et al. | 415/4.2 |

FOREIGN PATENT DOCUMENTS

| | | | |
|---|---|---|---|
| 0001970 | 8/1931 | Australia | 415/2.1 |
| 2290583 | 6/1976 | France | 415/4.3 |
| 0548238 | 1/1958 | Italy | 415/2.1 |

*Primary Examiner*—Edward K. Look
*Assistant Examiner*—Mark Sgantzos

[57] ABSTRACT

A new and improved wind turbine apparatus includes a housing assembly which includes an upper housing surface which includes a leading edge and a trailing edge. The upper housing surface is contoured to create a venturi action and to exert a reduced pressure at the trailing edge when wind flows across the upper housing surface from the leading edge to the trailing edge. A vane assembly is supported on a horizontal axle in a location such that vanes of the vane assembly are responsive to wind blowing in a direction from the leading edge to the trailing edge of the upper housing surface and such that the vanes are also exposed to reduced pressure near the trailing edge, whereby the vane assembly is caused to rotate on the horizontal axle. A base assembly supports the housing assembly and the vane assembly. The base assembly includes a circular guide assembly, and the housing assembly includes a guide-contacting portion for riding on the circular guide assembly in a circular movement. The circular guide assembly includes a flange, and the guide-contacting portion includes a guide wheel, supported by the housing assembly, for rolling against the circular guide assembly. An adjustable-pitch vane assembly may be used for adjusting pitch of the vanes with respect to the oncoming wind which contacts the vanes. An angular adjustment lock assembly is provided for locking the housing assembly at a selected angular orientation with respect to wind.

6 Claims, 5 Drawing Sheets

5,472,311

WIND TURBINE APPARATUS

This application is a continuation of application Ser. No. 08/123,167, filed Sep. 20, 1993, now abandoned.

BACKGROUND OF THE INVENTION

1. Field of the Invention

The present invention relates generally to devices for generating electrical energy and more particularly to devices for generating electrical energy from wind energy.

2. Description of the Prior Art

Throughout the years, a number of innovations have been developed relating to generating electrical energy from wind energy, and the following U.S. patents are representative of some of those innovations: U.S. Pat. Nos. 4,857,753; 4,890,976; 4,979,871; 5,083,901; and Des. 271,303. The cited patents disclose two basic principles utilized in converting wind energy into electrical energy. The first principle involves direct use of high pressure air of the wind to rotate a mechanical device. The second principle involves the use of the wind with a venturi to create low pressure to turn a mechanical device. U.S. Pat. Nos. 4,979,871 and Des. 271,303 operate on the first principle, the use of high pressure air of the wind to rotate a mechanical device. U.S. Pat. Nos. 4,857,753, 4,890,976, and 5,083,901, incorporated herein by reference, operate on the second principle, the use of the wind with a venturi to create low pressure to turn a mechanical device. Since both principles of operation offer distinct benefits, it would be desirable if a wind energy converting device were provided which operated with both the direct use of high pressure air of the wind and with the use of the wind with a venturi to create low pressure.

In U.S. Pat. No. 5,083,901, there is a disclosure of a plurality of turbine vanes, each of which has its own associated venturi. The complexity of the vane structures for this device is very great. In this respect, it would be desirable if a wind energy converting device were provided which employed one venturi for a plurality of turbine vanes.

A number of wind energy convertors employ vanes which operate around a vertically oriented support. Vanes on vertically oriented supports may be difficult to assemble and maintain because of their relatively large distance from the ground. In this respect, it would be desirable if a wind energy converting device were provided which provided a horizontal support for the wind vanes.

Tall vertical supports for wind vanes often require guy wires for additional support. In this respect, it would be desirable if a wind energy converting device were provided which precludes the need to use guy wires for providing additional support to the support for the wind vanes.

In a system for converting wind energy into electrical energy, an electrical generator is connected to a power take off of the wind vanes. Batteries may be charged by the generator to store energy for use at times when wind velocity decreases. The generator and the batteries must be housed in an appropriate structure. Ordinarily, such a housing would be separate and distinct from the wind vanes. In this respect, it would be desirable if a wind energy converting device included a housing which served multiple purposes, that is, on the one hand, providing a housing for an electrical generator and battery bank, and on the other hand, providing a venturi action for the wind vanes.

Wind direction often changes dramatically, so a device utilizing wind energy should be adjustable to changing wind direction. In this respect, it would be desirable if a wind energy converting device were provided which were readily adjustable to changed wind direction.

An electrical generator may operate optimally when it is driven in a prescribed range of rate of rotation. Wind speeds vary quite a bit, however, and adjustments should be made in a wind turbine for controlling the rate of rotation of the turbine, thereby controlling the rate of rotation of the electrical generator. One way to control the rate of rotation of the turbine is to control the pitch of the turbine vanes. In this respect, it would be desirable if a wind energy converting device were provided which included adjustable pitch vanes.

Thus, while the foregoing body of prior art indicates it to be well known to use the wind to generate electrical energy, the prior art described above does not teach or suggest a wind turbine apparatus which has the following combination of desirable features: (1) operates with both the direct use of high pressure air of the wind and with the use of the wind with a venturi to create low pressure; (2) employs one venturi for a plurality of turbine vanes; (3) provides a horizontal support for the wind vanes; (4) precludes the need to use guy wires for supporting the wind vanes; (5) provides a housing for both containing an electrical generator and a battery bank, and for providing a venturi action for the wind vanes; (6) is readily adjustable to changed wind direction; and (7) includes adjustable pitch vanes. The foregoing desired characteristics are provided by the unique wind turbine apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved wind turbine apparatus which includes a housing assembly which includes an upper housing surface which includes a leading edge and a trailing edge. The upper housing surface is contoured to create a venturi action and to exert a reduced pressure at the trailing edge when wind flows across the upper housing surface from the leading edge to the trailing edge. A vane assembly is supported on a horizontal axle in a location such that vanes of the vane assembly are responsive to wind blowing in a direction from the leading edge to the trailing edge of the upper housing surface and such that the vanes are also exposed to reduced pressure near the trailing edge, whereby the vane assembly is caused to rotate on the horizontal axle. A base assembly supports the housing assembly and the vane assembly.

The base assembly includes a circular guide assembly, and the housing assembly includes a guide-contacting portion for riding on the circular guide assembly in a circular movement. The circular guide assembly includes a flange, and the guide-contacting portion includes a guide wheel, supported by the housing assembly, for rolling against the circular guide assembly. A wind indicator assembly may be used to indicate wind direction.

The vane assembly includes a plurality of vanes, a rim for supporting the vanes, a plurality of spokes for supporting the rim, and a horizontal axle for supporting the spokes.

An adjustable-pitch vane assembly may be used for adjusting pitch of the vanes with respect to the oncoming wind which contacts the vanes. An angular adjustment lock assembly is provided for locking the housing assembly at a selected angular orientation with respect to wind. The angular adjustment lock assembly includes a fulcrum attached to the housing assembly. A handle is connected to the fulcrum, e.g. a hinge. A brake arm is also connected to the fulcrum, and a brake pad is connected to the brake arm. The brake pad frictionally engages the base assembly for locking the housing assembly at a selected angular orientation with respect to the base assembly and the oncoming wind.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved wind turbine apparatus which has all of the advantages of the prior art and none of the disadvantages.

It is another object of the present invention to provide a new and improved wind turbine apparatus which may be easily and efficiently manufactured and marketed.

It is a further object of the present invention to provide a new and improved wind turbine apparatus which is of durable and reliable construction.

An even further object of the present invention is to provide a new and improved wind turbine apparatus which is susceptible of a low cost of manufacture with regard to both materials and labor, and which accordingly is then susceptible of low prices of sale to the consuming public, thereby making such wind turbine apparatus available to the buying public.

Still yet a further object of the present invention is to provide a new and improved wind turbine apparatus which operates with both the direct use of high pressure air of the wind and with the use of the wind with a venturi to create low pressure.

Still another object of the present invention is to provide a new and improved wind turbine apparatus that employs one venturi for a plurality of turbine vanes.

Yet another object of the present invention is to provide a new and improved wind turbine apparatus which provides a horizontal support for the wind vanes.

Even another object of the present invention is to provide a new and improved wind turbine apparatus that precludes the need to use guy wires for supporting the wind vanes.

Still a further object of the present invention is to provide a new and improved wind turbine apparatus which provides a housing for both containing an electrical generator and a battery bank, and for providing a venturi action for the wind vanes.

Yet another object of the present invention is to provide a new and improved wind turbine apparatus that is readily adjustable to changed wind direction.

Still another object of the present invention is to provide a new and improved wind turbine apparatus which includes adjustable pitch vanes.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
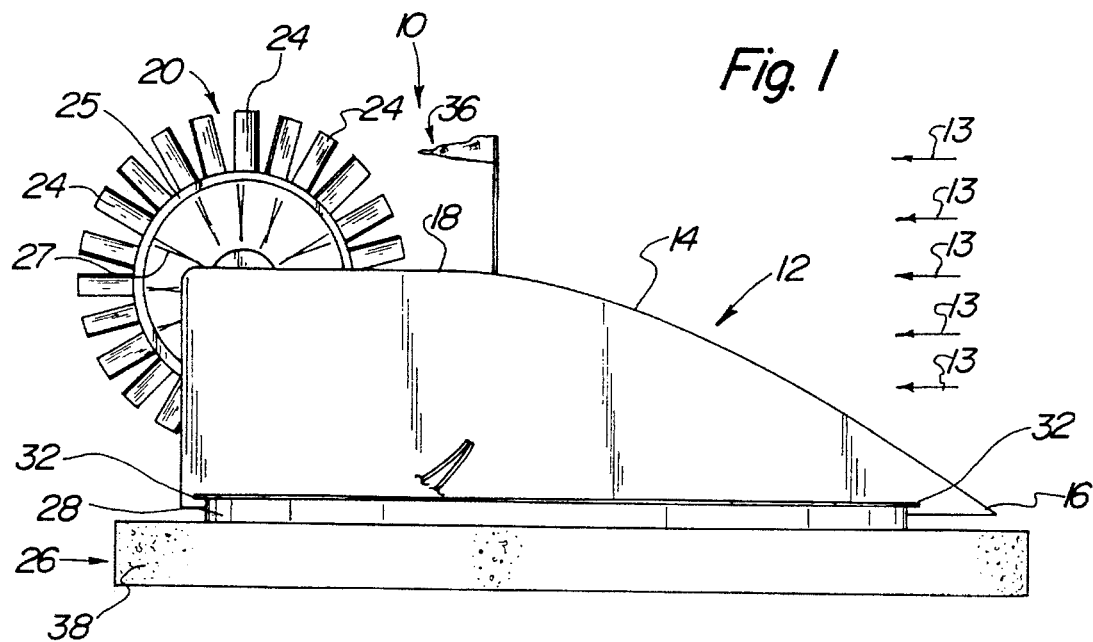
FIG. 1 is a side view showing a first preferred embodiment of the wind turbine apparatus of the invention.
Figure 2:
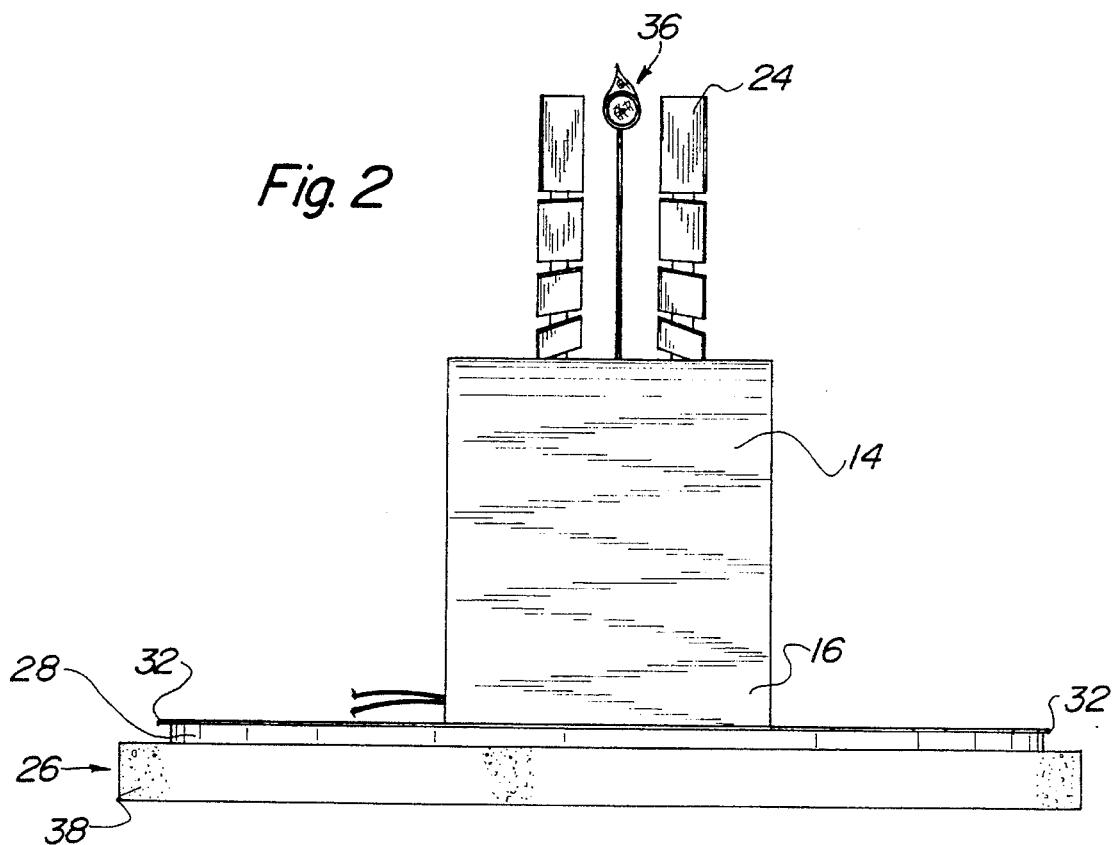
FIG. 2 is a front view of the wind turbine apparatus of FIG. 1.
Figure 3:
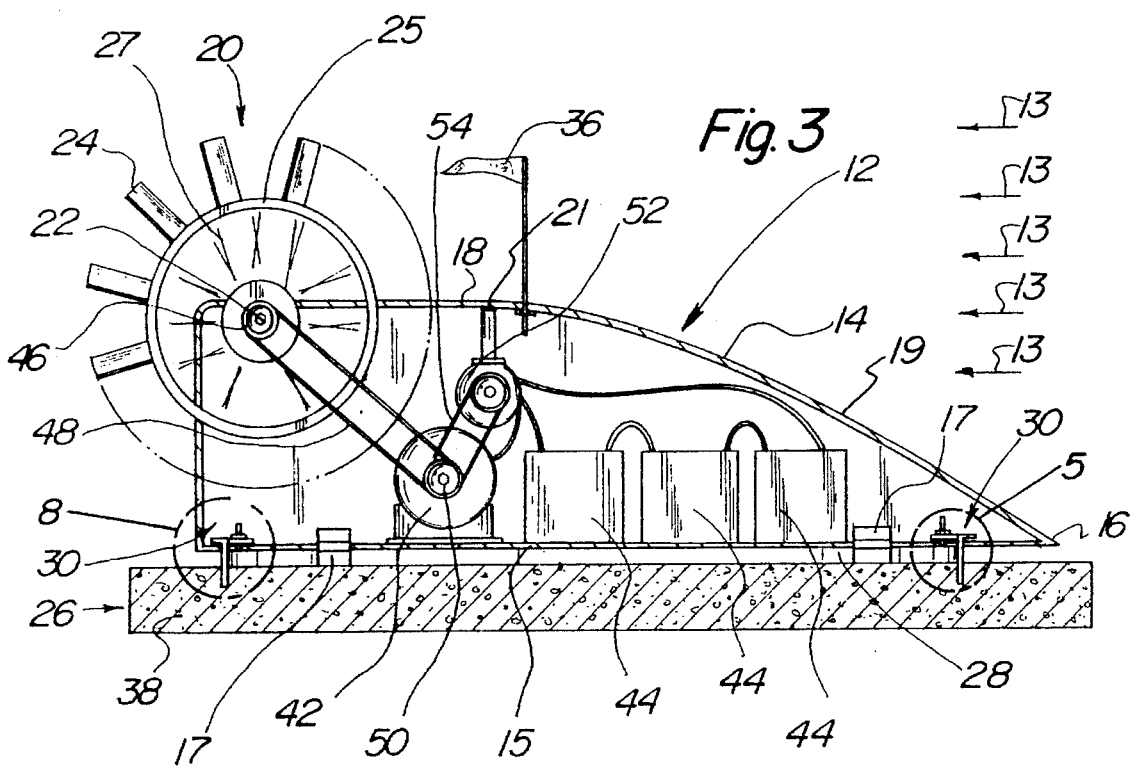
FIG. 3 is a longitudinal cross-sectional view of the wind turbine apparatus of FIG. 1.
Figure 5:
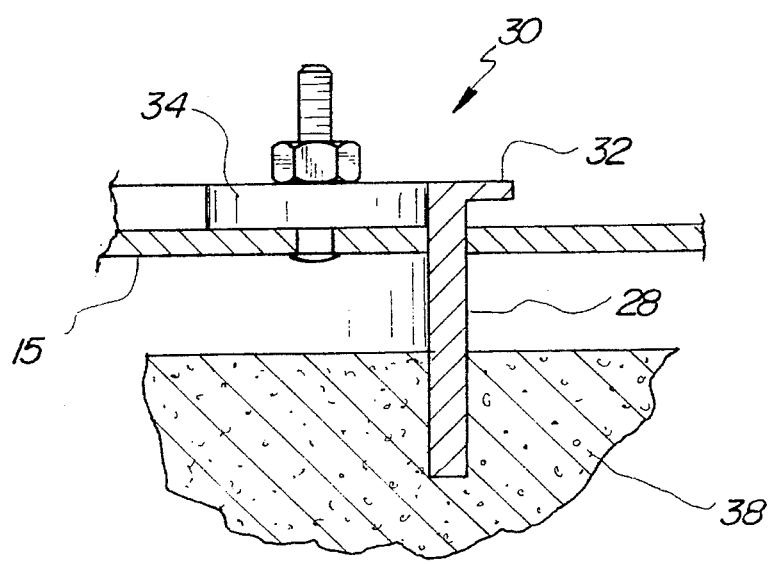
FIG. 5 is an enlarged cross sectional view of the area set forth in FIG. 3.
Figure 4:
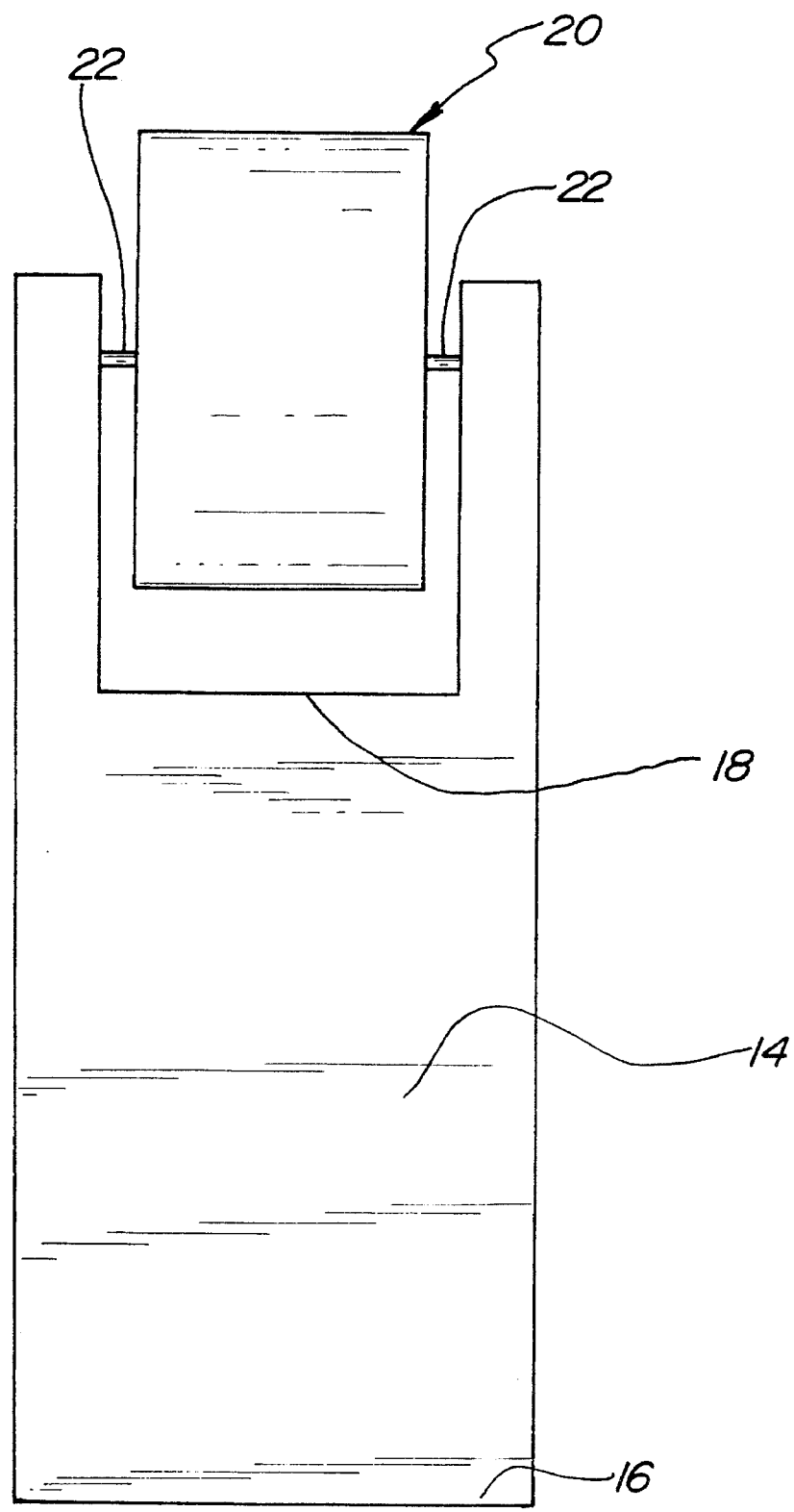
FIG. 4 is a top view of the wind turbine apparatus of FIG. 1.

With reference to the drawings, a new and improved wind turbine apparatus embodying the principles and concepts of the present invention will be described.

Turning initially to FIGS. 1–5, there is shown a first exemplary embodiment of the wind turbine apparatus of the invention generally designated by reference numeral 10. In its preferred form, wind turbine apparatus 10 includes a housing assembly 12 which includes an upper housing surface 14 which includes a leading edge 16 and a trailing edge 18. The upper housing surface 14 is contoured to create a venturi action and to exert a reduced pressure at the trailing edge 18 when wind flows across the upper housing surface 14 from the leading edge 16 to the trailing edge 18. The upper housing surface 14 includes a leading edge 16, a curved portion 19 extending backward from the leading edge 16, a straight portion 21 extending backward from the curved portion 19, and a trailing edge 18 located at a rear end of the straight portion 21, whereby the upper housing surface 14 is contoured such that it is capable of creating a venturi action and capable of exerting a reduced pressure at the trailing edge 18 when wind flows across the upper housing surface 14 from the leading edge 16, across the curved portion 19, and across the straight portion 21 to the trailing edge 18. A vane assembly 20 is supported on a horizontal axle 22 in a location such that vanes 24 of the vane assembly 20 are responsive to wind blowing in a direction from the leading edge 16 to the trailing edge 18 of the upper housing surface 14 and such that the vanes 24 are also exposed to reduced pressure near the trailing edge 18, whereby the vane assembly 20 is caused to rotate on the horizontal axle 22. The wind is represented by arrows 13. A base assembly 26 supports the housing assembly 12 and the vane assembly 20.

The base assembly 26 includes a circular guide assembly 28, and the housing assembly 12 includes a guide-contacting portion 30 for riding on the circular guide assembly 28 in a circular movement. The housing assembly 12 is supported by wheels 17 and can be rotated on the wheels 17 around the circular guide assembly 28 in order to orient the housing assembly 12 into the wind represented by arrows 13. The circular guide assembly 28 includes a flange 32, and the guide-contacting portion 30 includes a guide wheel 34, supported by the housing assembly 12, for rolling against the circular guide assembly 28.

The base assembly 26 includes a concrete slab 38 for supporting the wind turbine apparatus 10 of the invention. The circular guide assembly 28 is in the form of a steel ring supported by the concrete slab 38 wind indicator assembly 36 indicates wind direction. By observing the wind indicator assembly 36, a person can orient the housing assembly 12 so that the leading edge 16 is directly into the wind.

The interior of the housing assembly 12 contains an electric generator 42 and a bank of batteries 44 which are supported by the floor 15 of the housing assembly 12. A pulley 46 is located on the horizontal axle 22, and a first drive belt 48 transfers rotational power from the rotating pulley 46 to a pulley 50 on the electric generator 42. The horizontal axle 22 of the vane assembly 20 can also drive an alternator assembly 52 for recharging the batteries 44. A second drive belt 54 is connected between the electric generator 42 and the alternator assembly 52 and is used to drive the alternator assembly 52. For a relatively small wind turbine apparatus of the invention, the alternator can be a Mopar, 12 V, 60 Amp alternator. The alternator can be driven such that there are three revolutions of the alternator to one revolution of the vane assembly 20.

The vane assembly 20 includes a plurality of vanes 24, a rim 25 for supporting the vanes 24, a plurality of spokes 27 for supporting the rim 25, and a horizontal axle 22 for supporting the spokes 27.

Figure 6:
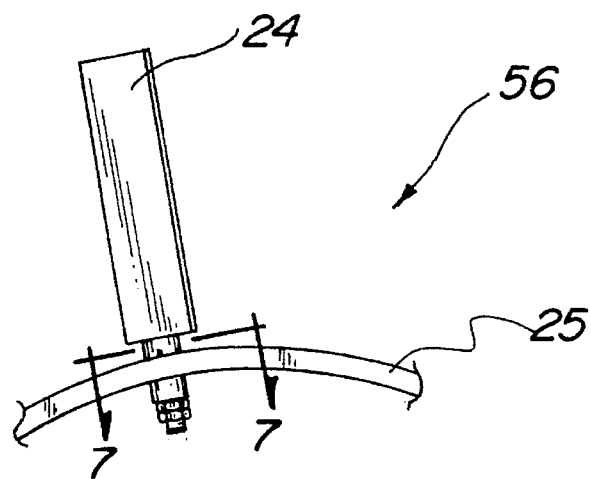
FIG. 6 is a partial perspective view of a second embodiment of the invention which includes an adjustable pitch vane.
Figure 7:
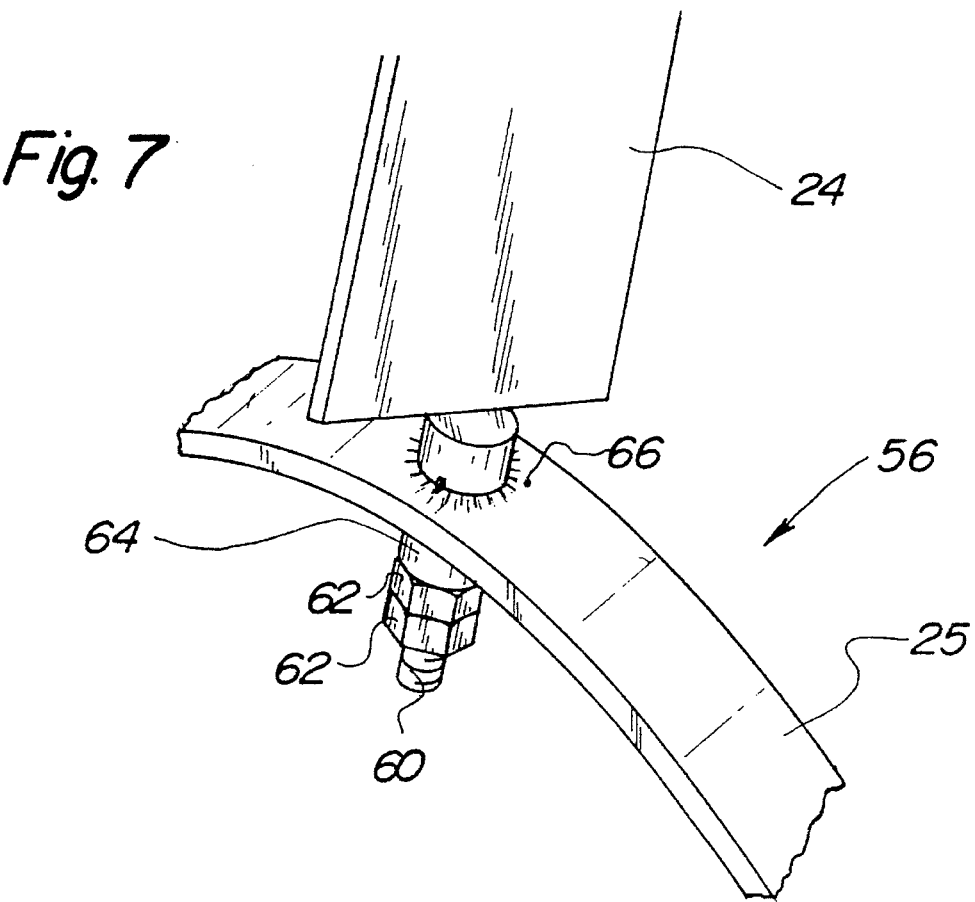
FIG. 7 is an enlarged partial perspective view of the adjustment assembly used with the adjustable vane shown in FIG. 6.

Turning to FIGS. 6–7, a second embodiment of the invention is shown. Reference numerals are shown that correspond to like reference numerals that designate like elements shown in the other figures. In addition, an adjustable-pitch vane assembly 56 is used for adjusting pitch of the vanes 24 with respect to the oncoming wind which contacts the vanes 24. More specifically, an adjustable-pitch vane assembly 56 is provided for each vane 24 and includes a vane axle 60 for supporting the respective vane 24. The vane axle 60 is attached to the rim 25 of the vane assembly 20. The vane 24 is adjustable by rotating the vane 24 around the vane axle 60, whereby the pitch of the vane 24 with respect to oncoming wind is adjusted. Lock nuts 62 screw onto the vane axle 60 to lock the vane 24 into a selected pitch angle. A spacer 64 is also provided. Indicia 66 (hash marks) are present on the rim 25 at each vane 24. The indicia 66 enable all of the vanes 24 to be adjusted at a consistent pitch angle.

The adjustable-pitch vane assembly 56 is used to control the amount of wind energy that drives the vanes 24 so that an optimum rate of rotation of the horizontal axle 22 will be applied to the electric generator 42. The actual adjustments to the pitch will also depend upon the overall mass of the vanes 24 and the associated structures in the vane assembly 20. The adjustment of the pitch will also depend upon the torque required to turn the electric generator 42 and other components driven by the horizontal axle 22.

Figure 8:
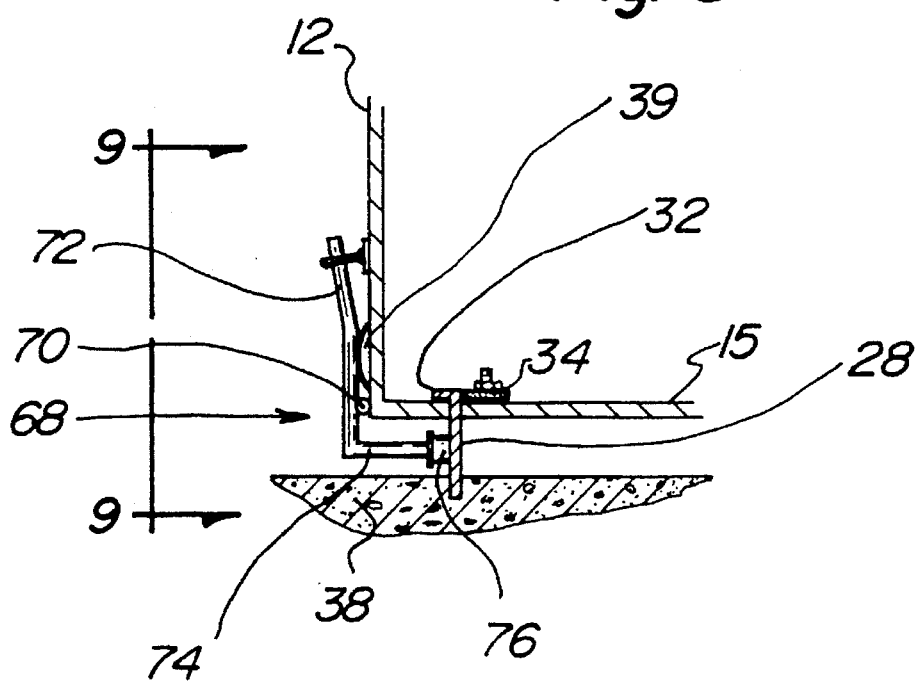
FIG. 8 is an enlarged view of the circled area 8 of the embodiment of the invention shown in FIG. 3 showing a locking assembly for locking the apparatus into a selected orientation into the wind.
Figure 9:
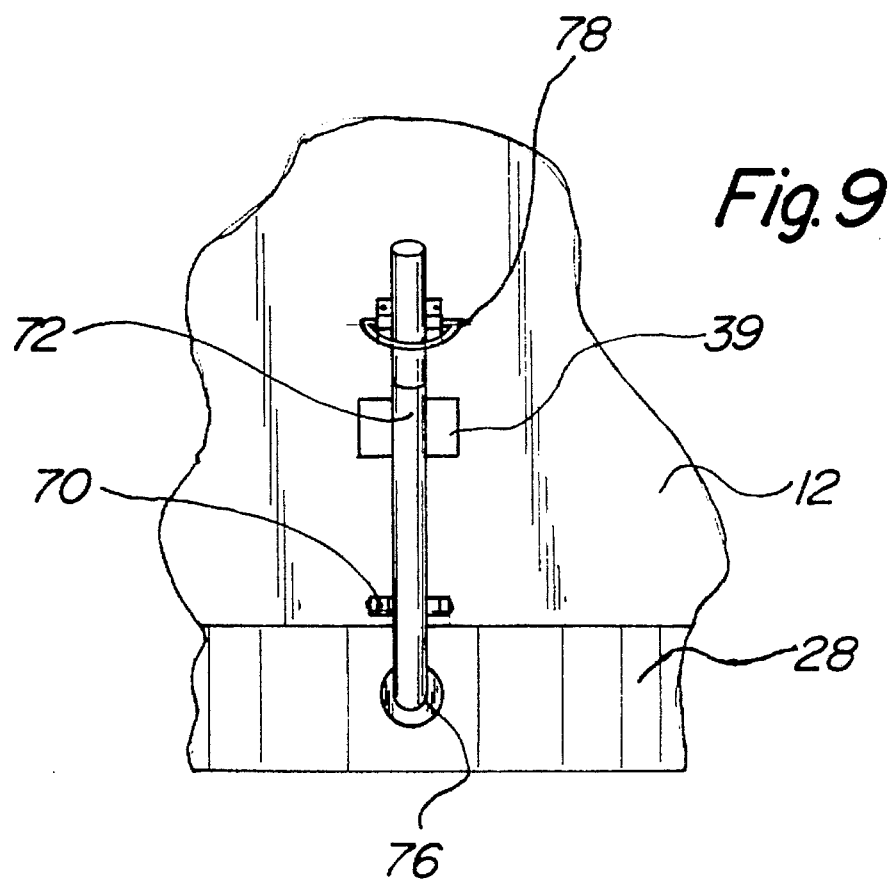
FIG. 9 is an enlarged partial side view of the embodiment of the locking assembly of the invention shown in FIG. 8, taken along line 9—9 thereof.

Turning to FIGS. 8–9, an embodiment of the invention is shown which enables the wind turbine apparatus 10 of the invention to be locked into a selected angular adjustment with respect to oncoming wind shown by arrows 13. Reference numerals are shown that correspond to like reference numerals that designate like elements shown in the other figures. In addition, an angular adjustment lock assembly 68 is provided for locking the housing assembly 12 at a selected angular orientation with respect to wind. The angular adjustment lock assembly 68 includes a fulcrum 70 attached to the housing assembly 12. A handle 72 is connected to the fulcrum 70, e.g. a hinge 70. A brake arm 74 is also connected to the fulcrum 70, and a brake pad 76 is connected to the brake arm 74. The brake pad 76 frictionally engages the circular guide assembly 28 of the base assembly 26 for locking the housing assembly 12 at a selected angular orientation with respect to the base assembly 26 and the oncoming wind.

A ring 78 is used to lock the handle 72 into a locked position. To unlock the handle 72, the ring 78 is lifted, and the handle 72 is moved toward the housing assembly 12. When this occurs, by pivoting around the fulcrum 70, the brake pad 76 and brake arm 74 move away from the circular guide assembly 28 thereby permitting free relative motion between the housing assembly 12 and the base assembly 26. In this condition, the housing assembly 12 can be moved relative to the base assembly 26. When a new position for the housing assembly 12 is selected, so that the housing assembly 12 can be aimed into the wind, the handle 72 is moved in the opposite direction to apply the brake pad 76 to the base assembly 26 and to lock the housing assembly 12 in the new position. The ring 78 can be reaffixed to the handle 72 to secure the lock into a continuously locking condition.

The components of the wind turbine apparatus of the invention can be made from inexpensive and durable metal and plastic materials. Other materials that can be used include wood and fiberglass.

For a relatively large embodiment of the wind turbine apparatus of the invention, the vane assembly 20 can be approximately 40 feet in diameter. The upper housing surface 14 which provides the venturi can be 45 feet long and 6 to 8 feet wide. The height of the housing assembly 12 is approximately half the height of the vane assembly 20 or 20 feet. The base assembly 26 can include a concrete slab 38 that is more than 90 feet in diameter. The steel ring that guides the housing assembly 12 in a rotational adjustment on the base assembly 26 is approximately 90 feet in diameter.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wind turbine apparatus that is low in cost, relatively simple in design and operation, and which operates with both the direct use of high pressure air of the wind and with the use of the wind with a venturi to create low pressure. With the invention, a wind turbine apparatus is provided which employs one venturi for a plurality of turbine vanes. With the invention, a wind turbine apparatus is provided which provides a horizontal support for the wind vanes. With the invention, a wind turbine apparatus is provided which precludes the need to use guy wires for supporting the wind vanes. With the invention, a wind turbine apparatus is provided which provides a housing for both containing an electrical generator and a battery bank, and for providing a venturi action for the wind vanes. With the invention, a wind turbine apparatus is provided which is readily adjustable to changed wind direction. With the invention, a wind turbine apparatus is provided which includes adjustable pitch vanes.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A wind turbine apparatus, comprising:
    a housing assembly which includes an upper housing surface having a leading edge, a curved portion extending backward from the leading edge, a straight portion extending backward from said curved portion, and a trailing edge located at a rear end of said straight portion, said upper housing surface being contoured so as to create a venturi action and exert a reduced pressure at said trailing edge as wind flows across said upper housing surface from said leading edge, across said curved portion and across said straight portion to said trailing edge, wherein said housing assembly also serves as a housing for an electrical generator and a battery bank,
    a vane assembly supported on a horizontal axle in a location such that vanes of said vane assembly are responsive to wind blowing in a direction from said leading edge to said trailing edge of said upper housing surface and such that said vanes are also exposed to reduced pressure near said trailing edge, whereby said vane assembly is caused to rotate on said horizontal axle, and
    a base assembly for supporting said housing assembly and said vane assembly.
2. The apparatus described in claim 1 wherein:
    said base assembly includes a circular guide assembly, and
    said housing assembly includes a guide-contacting portion for riding on said circular guide assembly in a circular movement.
3. The apparatus described in claim 2 wherein:
    said circular guide assembly includes a flange, and
    said guide-contacting portion includes a guide wheel, supported by said housing assembly, for rolling against said circular guide assembly.
4. The apparatus described in claim 1, further including:
    a wind indicator assembly for indicating wind direction.
5. The apparatus described in claim 1 wherein said vane assembly includes:
    a plurality of vanes,
    a rim for supporting said vanes,
    a plurality of spokes for supporting said rim, and
    a horizontal axle for supporting said spokes.
6. The apparatus described in claim 1, further including:
    an adjustable-pitch vane assembly for adjusting pitch of a vane with respect to wind contacting said vanes.

* * * * *